C. A. WAKEFIELD.
Hand Seeder.

No. 55,399.

Patented June 5, 1866.

Witnesses:
L. Holmes Jr
J. W. Coombs

Inventor:
Chas. A Wakefield

AM. PHOTO-LITHO. CO. N.Y. (OSBORNE'S PROCESS.)

UNITED STATES PATENT OFFICE.

CHARLES A. WAKEFIELD, OF PITTSFIELD, MASSACHUSETTS.

IMPROVEMENT IN HAND CORN-PLANTERS.

Specification forming part of Letters Patent No. 55,399, dated June 5, 1866.

*To all whom it may concern:*

Be it known that I, CHARLES A. WAKEFIELD, of Pittsfield, in the county of Berkshire and State of Massachusetts, have invented certain new and useful Improvements in Hand Seed-Planters; and I do hereby declare that the following is a full, clear, and exact description of the same, reference being had to the annexed drawings, making a part of this specification, in which—

Figure 1:
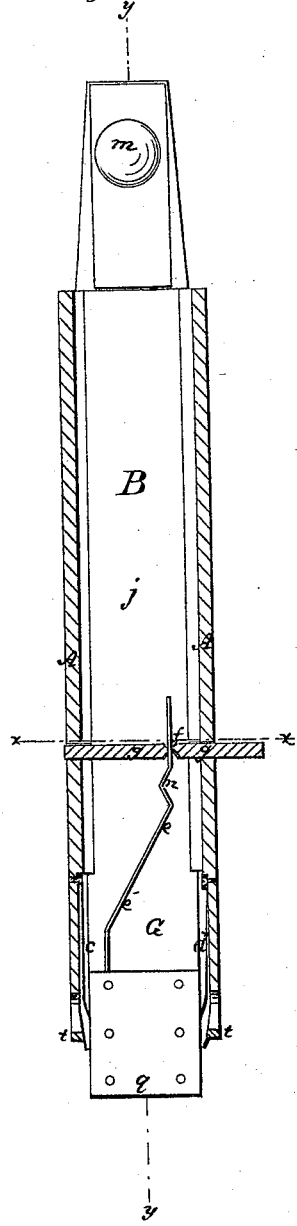
Figure 2:
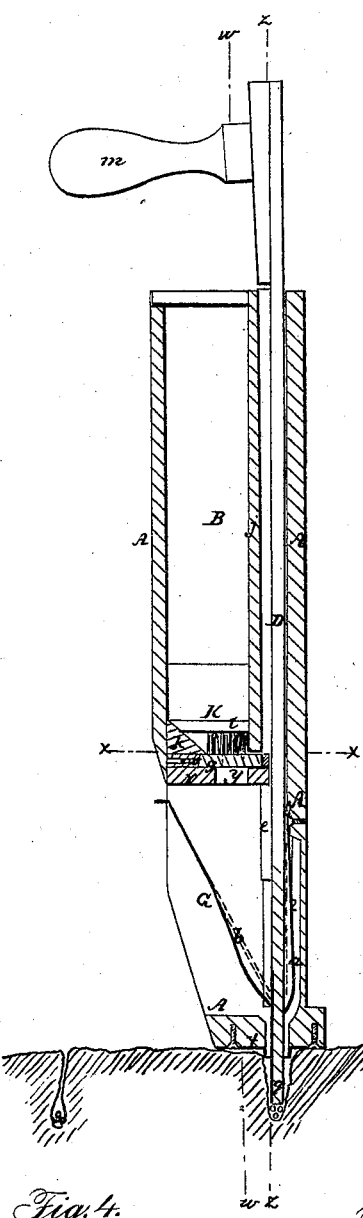
Figure 3:
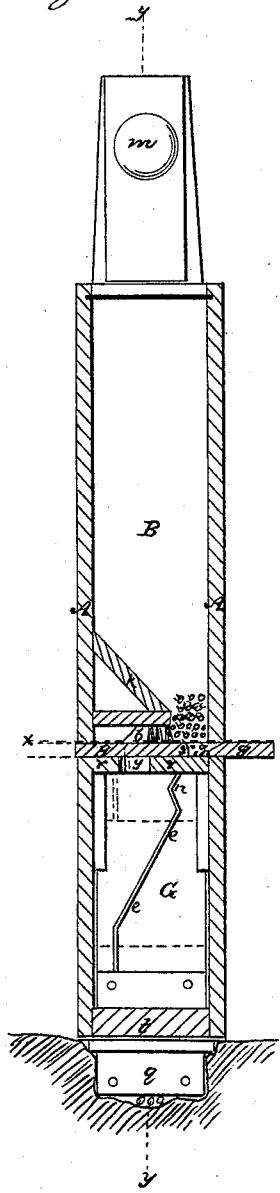
Figure 4:
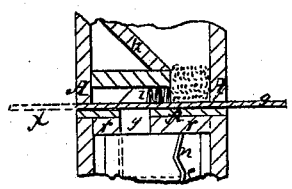
Figure 5:
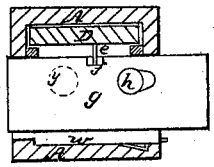

Figure 1 is a vertical section taken in the line $z\ z$ of Fig. 2. Fig. 2 is a vertical section taken in the line $y\ y$ of Figs. 1 and 3. Fig. 3 is a vertical section taken in the line $w\ w$ of Fig. 2. Fig. 4 is a vertical section of a portion of the planter, taken in the line $w\ w$, and showing the manner in which it is adapted to planting seed of various kinds and sizes. Fig. 5 is a horizontal or transverse section taken in the line $x\ x$ of the other figures.

Similar letters of reference indicate corresponding parts in all the figures.

Much difficulty has heretofore been experienced in the practical operation of hand-planters, from the fact that when used in moist soil their plungers have been very liable to become clogged by the adhesion of damp earth thereto, which has thus prevented their proper working.

This invention is designed to remedy this defect, and also to provide an efficient means of moving the seed-slide—means whereby the above-mentioned results are obtained—applicable either to the seed-planter which is the subject-matter of my Letters Patent No. 11,395, dated July 25, 1854, or to other seed-planters of similar character.

To enable those skilled in the art to understand the construction and operation of my invention, I will proceed to describe it with reference to the drawings, which represent it applied to the seed-planter which is the subject of my above-mentioned Letters Patent.

A is the body of the planter, which carries the upper parts thereof, and the main length of which, above the transverse horizontal partition $r$, is occupied by the hopper B, containing the seed to be planted, there being a narrow space between the rear of the said hopper and that of the body A, through which passes the flat plunger D, having a longitudinal reciprocating movement therein, such reciprocating movement being limited by a suitable stop projecting back from the rearmost side of the said plunger and working in a longitudinal slot of proper length formed in the rear side of the body A. The plunger is furnished with a handle, $m$, at its upper end, by means of which the planter is carried and the plunger operated.

$r$ is a transverse horizontal partition which supports the seed-slide $g$, the said slide having a reciprocating movement upon the said partition, with its ends passing through suitable transverse slots in the sides of the body A. The said slide derives its reciprocating motion from an inclined or oblique tongue or feather, $e$, which may be formed of sheet metal, and which projects forward from the inner surface of the plunger D, and fits into a notch, $f$, formed in the rearmost edge of the said seed-slide, as represented in Fig. 1, in such a way that when the plunger is pushed downward it will move the slide $g$ in one direction, and when the plunger is pushed upward it will move the slide in an opposite direction, thus giving it the necessary reciprocating motion, without the same liability to stick or bind which exists with the groove and pin used in the seed-planter which is the subject of my Letters Patent hereinbefore mentioned.

One or more zigzag curves or deflectors, $n$, are formed upon the feather $e$, above its oblique portion, in order to give the slide a shaking motion when it receives the seed from the hopper, in order to facilitate the regular and uniform filling of the hole $h$ thereof, the said hole carrying the seed to the hole $y$ in the partition $r$, through which it falls into the receptacle formed between the lower ends of the scrapers $b$ and $a$ when the plunger is raised, as will presently be explained.

The bottom of the hopper is formed by inclined blocks $k\ k'$, situated above the seed-slide $g$, and so arranged as to guide or deflect the seed, as it descends, into the hole $h$ of the said slide.

To the under side of the block $k'$ is secured a brush, $l$, which, in the usual manner, brushes the surplus seed from the top of the hole $h$ as it passes toward the hole $y$.

The hole $h$ of the slide $g$ is made sloping or beveled at the rearmost side of its upper end, as shown in Figs. 3 and 5. This peculiar form of the said hole $h$ forms an important feature of my invention, inasmuch as it has been found by experiment to insure the proper and uniform filling of the said hole with seed in a much greater degree than has heretofore been obtained, especially in the planting of Indian corn, inasmuch as it allows the kernels to more readily adjust themselves to the shape of the hole. It has also the further beneficial effect of preventing, in a measure, the excessive wear of the brush $l$, inasmuch as the surplus kernels are more easily swept from above the said hole than where this slope is dispensed with, and consequently do not break down the brush in the same degree.

Situated transversely in the lower portion, C, of the frame A are the elastic scrapers $a$ and $b$, which clean the damp earth from the front and rear sides of the lower end of the plunger. These scrapers are formed of sheet metal, and the front scraper, $b$, is secured in place by having the upper portions of its edges placed in suitable grooves formed in the sides of the body A in such a way as to be easily removed, and so as to permit its lower end to have the requisite movement during the operation of the planter.

The rear scraper, $a$, is screwed fast at its upper end to the rearmost side of the frame A, which is hollowed out somewhat to accommodate the said scraper. The lower end of the scraper $b$ presses against the front side of the lower end of the plunger when the said plunger is in its lowest position, and in like manner the scraper $a$ presses upon the rearmost side of the plunger, their joint action cleaning or scraping the adhering moist earth or soil from the said plunger as it is drawn upward, and the lower ends of the scraper coming together underneath the plunger, as shown in red lines in Fig. 2, when it is in its highest position, constitute a receptacle into which the seed falls from the seeding-slide, so that the descent of the plunger forces it into the ground, as will be presently described.

$c$ and $d$, as shown in Fig. 1, indicate narrow elastic scrapers which are secured one upon each of the inner sides of the body A, and the lower ends of which scrape the moist earth from the edges of the lower end of the plunger in the same manner that the scrapers $a$ and $b$ scrape it from the sides thereof.

In order to adapt the planter to the planting of seeds of less size than those of Indian corn the slide $g$ may be made thinner and with a smaller hole, $h$, the thickness of the slide and the size of its hole $h$ being proportioned to the size of the seed to be planted, a flat removable plate, $j'$, being placed between the slide and the partition $r$, to make up for the difference in the thickness of the slides. The said plate $j'$ is kept in place by a small pin, $v$, which fits into a corresponding hole in the partition $r$, the slide being operated by the feather $e$ in the same manner as hereinbefore described, and the plate provided with a hole corresponding to the hole $y$ in the partition $r$.

It should be mentioned that the slide in any case is not as wide as the partition $r$, in order that it may be easily introduced into its place, and is kept in position by a key, $w$, (shown in Fig. 2,) which is situated between the front edge of the slide and the front side of the body A.

The operation of the invention is as follows: The corn or other seed, being first placed in the hopper B, descends by its own weight into the hole $h$ of the seed-slide when the said slide is in the position represented in Fig. 3. The planter being then lifted up by means of the handle $m$, the body A descends upon the plunger D by its own weight, so that the lower end of the said plunger is brought above the lower ends of the scrapers, which during such descent scrape away the damp earth that may adhere to the sides and edges of the plunger, the scrapers $a$ and $b$ being thus allowed to come in contact with each other, as shown by the red lines in Fig. 2. At the same time the movement of the plunger with regard to the seed-slide $g$ causes the feather $e$ to first shake or agitate the slides by means of the zigzag curve $n$, and then to move it so that the hole $h$ is brought over the hole $y$, the brush $l$ sweeping the surplus kernels or seed from the top of the hole and the beveled or sloping surface of the rearmost side thereof allowing the kernels, when corn is planted, to easily adjust themselves in the said hole, so that a uniform number of kernels are carried by the same at each operation of the apparatus. The seed falling through the hole $y$ descends into the receptacle formed by the lower ends of the scrapers $a$ and $b$, immediately under the end $q$ of the plunger. The lower end, $t$, of the body A is then placed upon the ground and the plunger pushed downward, forcing the seed down between the scrapers and into the ground, as shown in Figs. 2 and 3, the feather $e$ causing the seed-slide to resume its first position, as shown in Fig. 3. The planter is then again raised by the handle $m$, and the operation repeated in planting the succeeding hills.

What I claim as my invention, and desire to secure by Letters Patent, is—

1. The inside scraper, $a$, applied to the rear surface of the plunger, in combination with the scraper $b$, applied to the front surface thereof, substantially as herein set forth, for the purpose specified.

2. The side scrapers, $c$ and $d$, applied to the plunger, substantially as herein set forth, for the purpose specified.

3. The oblique tongue or feather $e$, working in the notch $f$ of the slide $g$, to operate the said slide, substantially as herein set forth, for the purpose specified.

4. The zigzag deflectors $n$ in the feather $e$, operating the slide $g$, substantially as herein set forth, for the purpose specified.

CHAS. A. WAKEFIELD.

Witnesses:
A. LE CLERC,
J. W. COOMBS.